(12) United States Patent
Ishii et al.

(10) Patent No.: US 11,029,881 B2
(45) Date of Patent: Jun. 8, 2021

(54) MEMORY CONTROLLER, MEMORY SYSTEM, AND INFORMATION PROCESSING SYSTEM

(71) Applicant: SONY CORPORATION, Tokyo (JP)

(72) Inventors: Ken Ishii, Tokyo (JP); Hiroyuki Iwaki, Kanagawa (JP); Kenichi Nakanishi, Tokyo (JP); Yasushi Fujinami, Tokyo (JP); Tatsuo Shinbashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 244 days.

(21) Appl. No.: 16/311,100

(22) PCT Filed: Apr. 17, 2017

(86) PCT No.: PCT/JP2017/015412
§ 371 (c)(1),
(2) Date: Dec. 18, 2018

(87) PCT Pub. No.: WO2018/003244
PCT Pub. Date: Jan. 4, 2018

(65) Prior Publication Data
US 2020/0310681 A1    Oct. 1, 2020

(30) Foreign Application Priority Data
Jun. 29, 2016   (JP) .............................. JP2016-129012

(51) Int. Cl.
*G06F 3/06*         (2006.01)
*G06F 11/10*        (2006.01)
(52) U.S. Cl.
CPC .......... *G06F 3/0659* (2013.01); *G06F 3/0604* (2013.01); *G06F 3/0673* (2013.01); *G06F 11/1076* (2013.01)

(58) Field of Classification Search
CPC ..................................................... G06F 3/0659
See application file for complete search history.

(56) References Cited

U.S. PATENT DOCUMENTS 6,272,052 B1     8/2001  Miyauchi
2003/0217239 A1  11/2003 Jeddeloh
(Continued)

FOREIGN PATENT DOCUMENTS

JP   2000-067574 A   3/2000
JP   2005-525652 A   8/2005
(Continued)

OTHER PUBLICATIONS

International Search Report and Written Opinion of PCT Application No. PCT/JP2017/015412, dated Jul. 18, 2017, 09 pages of ISRWO.

*Primary Examiner* — Prasith Thammavong
*Assistant Examiner* — Edmund H Kwong
(74) *Attorney, Agent, or Firm* — Chip Law Group

(57) ABSTRACT

The order of read access to a memory is appropriately determined. A memory system includes a plurality of memories and a memory controller. The memory controller includes a memory write control unit and a memory read control unit. The memory write control unit generates a write request for any one of the plurality of memories on the basis of a write command from a computer. The memory read control unit generates a read request for any one of the plurality of memories according to priority corresponding to a data processing state of write data related to the write request in the memory write control unit on the basis of a read command from the computer.

5 Claims, 15 Drawing Sheets

(56) References Cited

U.S. PATENT DOCUMENTS

2014/0136743 A1    5/2014  Yamamoto
2015/0113203 A1*   4/2015  Dancho .............. G11C 16/0483
                                                              711/102

FOREIGN PATENT DOCUMENTS

JP      2014-154119 A    8/2014
WO         03/098392 A2  11/2003
WO      2013/014841 A1   1/2013

* cited by examiner

FIG. 6

| PRESENCE OR ABSENCE IN COMMAND QUEUE (rcommand) | BUSY STATE (die_busy) | DATA PROCESSING STATE OF WRITE DATA (enc_busy) | PRIORITY |
|---|---|---|---|
| PRESENT (1) | IDLE (0) | DATA IS BEING PREPARED (1) | HIGH |
| | | DATA IS NOT BEING PREPARED (0) | MEDIUM |
| | BUSY (1) | --- | NONE |
| ABSENT (0) | --- | --- | |

FIG. 13

| PRESENCE OR ABSENCE IN COMMAND QUEUE (rcommand) | BUSY STATE (die_busy) | DATA PROCESSING STATE OF WRITE DATA (enc_busy, data_ready) | PRIORITY |
|---|---|---|---|
| PRESENT (1) | IDLE (0) | DATA IS BEING PREPARED (1, 0) | HIGH |
| | | DATA IS NOT BEING PREPARED (0, 0) | MEDIUM |
| | | PREPARATION OF DATA HAS BEEN COMPLETED (0, 1) | LOW |
| | BUSY (1) | --- | NONE |
| ABSENT (0) | --- | --- | |

MEMORY CONTROLLER, MEMORY SYSTEM, AND INFORMATION PROCESSING SYSTEM

CROSS REFERENCE TO RELATED APPLICATIONS

This application is a U.S. National Phase of International Patent Application No. PCT/JP2017/015412 filed on Apr. 17, 2017, which claims priority benefit of Japanese Patent Application No. JP 2016-129012 filed in the Japan Patent Office on Jun. 29, 2016. Each of the above-referenced applications is hereby incorporated herein by reference in its entirety.

TECHNICAL FIELD

The present technology relates to a memory controller that controls a memory. More particularly, the present technology relates to a memory controller, a memory system, and an information processing system that generate requests for a plurality of memories on the basis of a command issued from a computer.

BACKGROUND ART

A technique has been known which changes a reading order to increase the speed of memory access to a plurality of memories (for example, memory banks or dies). For example, a device has been proposed which changes the order in which memory commands are issued on the basis of the past command issue history stored in a command history buffer and two or more newly requested commands in a case where there is a write request from a command issue source circuit (for example, see Patent Document 1).

CITATION LIST

Patent Document

Patent Document 1: Japanese Patent Application Laid-Open No. 2014-154119

SUMMARY OF THE INVENTION

Problems to be Solved by the Invention

In the above-mentioned technique according to the related art, the order in which the memory commands are issued is changed on the basis of the command issue history and the newly requested commands. However, in a memory that requires, for example, a process of generating an error correcting code for write data, there is a concern that it will be difficult to appropriately determine the order of read access to the memories depending on the processing state of data. That is, even in a case where a plurality of memories are in an idle state, the state of the memories in the near future is likely to vary depending on the processing state of data. In some cases, it is difficult to appropriately determine for which memory read access is to be performed first.

The present technology has been made in view of the above-mentioned circumstances and an object of the present technology is to appropriately determine the order of read access to memories.

Solutions to Problems

The present technology has been made to solve the above-mentioned problem, and a first aspect of the present technology is a memory controller, and a memory system and an information processing system including the memory controller, the memory controller including: a memory write control unit that generates a write request for any one of a plurality of memories on the basis of a write command from a computer; and a memory read control unit that generates a read request for any one of the plurality of memories according to priority corresponding to a data processing state of write data related to the write request in the memory write control unit on the basis of a read command from the computer. By the above-mentioned configuration, the effect of requiring a read request of any one of a plurality of memories according to priority corresponding to the data processing state of the write data is obtained.

Further, in the first aspect, the memory write control unit may include: an error correcting code generation unit that generates an error correcting code for the write data; and a busy signal generation unit that generates, as the data processing state, a busy signal indicating whether or not the error correcting code for the write data is being generated for each of the plurality of memories, and the memory read control unit may set the priority of a memory corresponding to the busy signal indicating that the error correcting code is being generated among the plurality of memories to be high. By the above-mentioned configuration, the effect of preferentially requiring a read request of the memory showing that the error correcting code is being generated is obtained.

Further, in the first aspect, the memory write control unit may further include: a data buffer that stores the write data for which the error correcting code has been generated; and a ready signal generation unit that generates, as the data processing state, a ready signal indicating whether or not the generation of the error correcting code for the write data has been completed for each of the plurality of memories and whether or not the write data has been prepared in the data buffer, and the memory read control unit may set the priority of a memory corresponding to the ready signal indicating that the generation of the error correcting code has been completed among the plurality of memories to be low. By the above-mentioned configuration, the effect of preferentially requiring a read request of memories other than the memory showing that the generation of the error correcting code has been completed is obtained.

Further, in the first aspect, the memory read control unit may include: a command queue that stores the read command from the computer; a read command selection unit that sets the priority corresponding to the data processing state of the write data related to the write request in the memory write control unit to each of the plurality of memories and selects a read command for any one of the plurality of memories from the command queue according to the priority; and a memory request/address transmitting unit that generates a read request and an address for any one of the plurality of memories on the basis of the selected read command and transmits the read request and the address to the memory. By the above-mentioned configuration, the effect of transmitting a read request according to the priority set by the read command selection unit is obtained.

Effects of the Invention

According to the present technology, the effect of appropriately determining the order of read access to the memories can be obtained. In addition, the effects described herein

BRIEF DESCRIPTION OF DRAWINGS

FIG. 6 is a diagram illustrating an example of the rule of giving priority to a read command by a read command selection unit 254-1 in the first embodiment of the present technology.

FIG. 13 is a diagram illustrating an example of the rule of giving priority to a read command by a read command selection unit 254-1 in the second embodiment of the present technology.

MODE FOR CARRYING OUT THE INVENTION

Hereinafter, modes (hereinafter, referred to as embodiments) for carrying out the present technology will be described. The description will be made in the following order.

1. First embodiment (Example in Which High Priority Is Given to Read Command for Memory Die in Which Write Data Is Being Prepared)

2. Second Embodiment (Example in Which Low Priority Is Given to Read Command for Memory Die in Which Preparation of Write Data Has Been Completed)

1. First Embodiment

[Configuration of Information Processing System]

Figure 1:
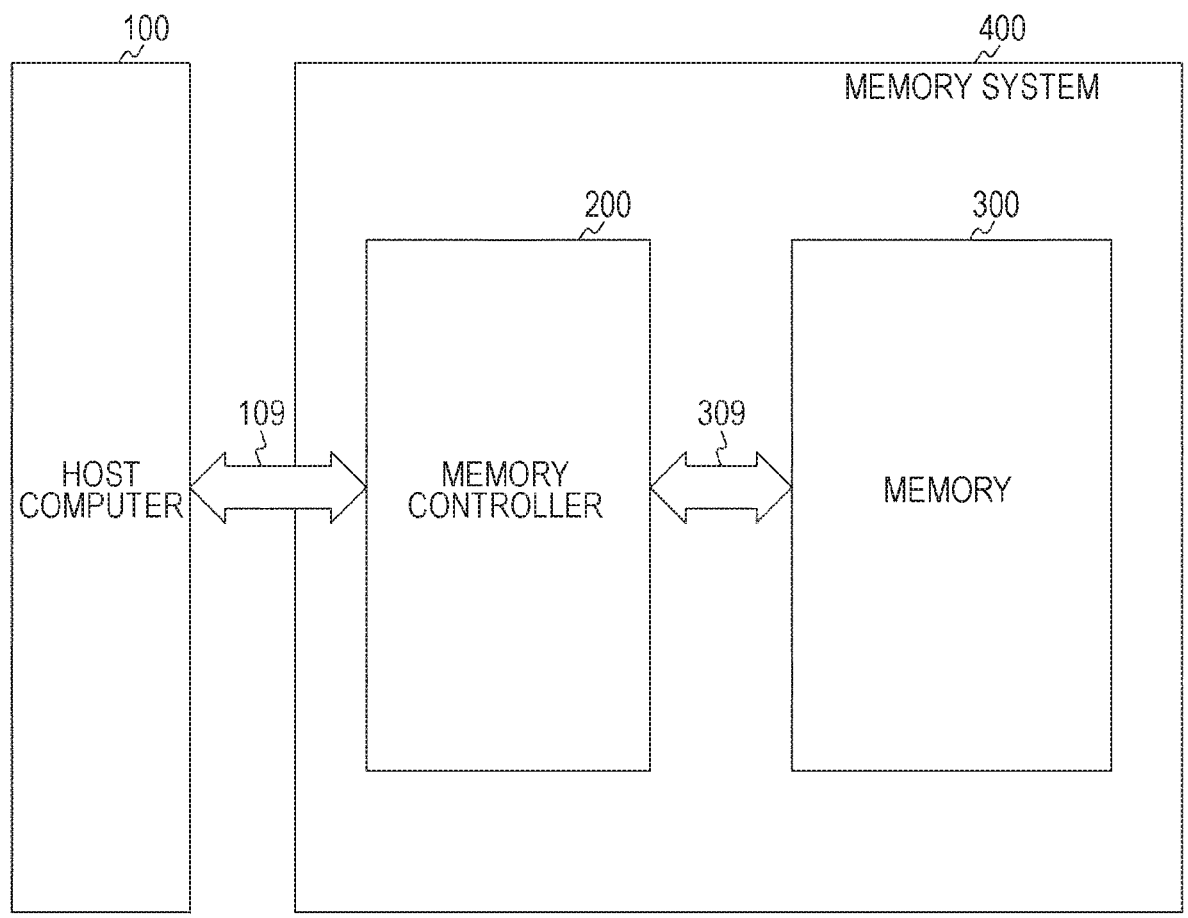
FIG. 1 is a diagram illustrating an example of the configuration of an information processing system in an embodiment of the present technology.

FIG. 1 is a diagram illustrating an example of the configuration of an information processing system according to an embodiment of the present technology. The information processing system includes a host computer 100, a memory controller 200, and a memory 300. The memory controller 200 and the memory 300 form a memory system 400.

The host computer 100 issues commands to perform, for example, a reading process and a writing process to the memory 300. The host computer 100 includes a processor (not illustrated) that performs the processes of the host computer 100 and a controller interface (not illustrated) for data exchange with the memory controller 200. In addition, the host computer 100 generally includes a data buffer. The host computer 100 and the memory controller 200 are connected by a signal line 109. In addition, the host computer 100 is an example of a computer described in the claims.

The memory controller 200 performs request control for the memory 300 in response to a command from the host computer 100. The memory controller 200 and the memory 300 are connected by a signal line 309.

The memory 300 includes a control unit and a memory cell array (which are not illustrated). The control unit of the memory 300 accesses memory cells in response to a request from the memory controller 200. The memory cell array of the memory 300 is a memory cell array including a plurality of memory cells. In the memory cell array, memory cells, each of which stores one of binary values for each bit, or memory cells, each of which stores any one of multiple values for a plurality of bits, are arranged two-dimensionally (in a matrix). A non-volatile memory (NVM), in which a page having a multi-byte size is the unit of read access or write access and on which data can be overwritten without being erased, is assumed as the memory cell array. In addition, a memory including a plurality of non-volatile memories (for example, dies or chips) each of which can be independently accessed is assumed as the memory 300.

[Configuration of Memory Controller]

Figure 2:
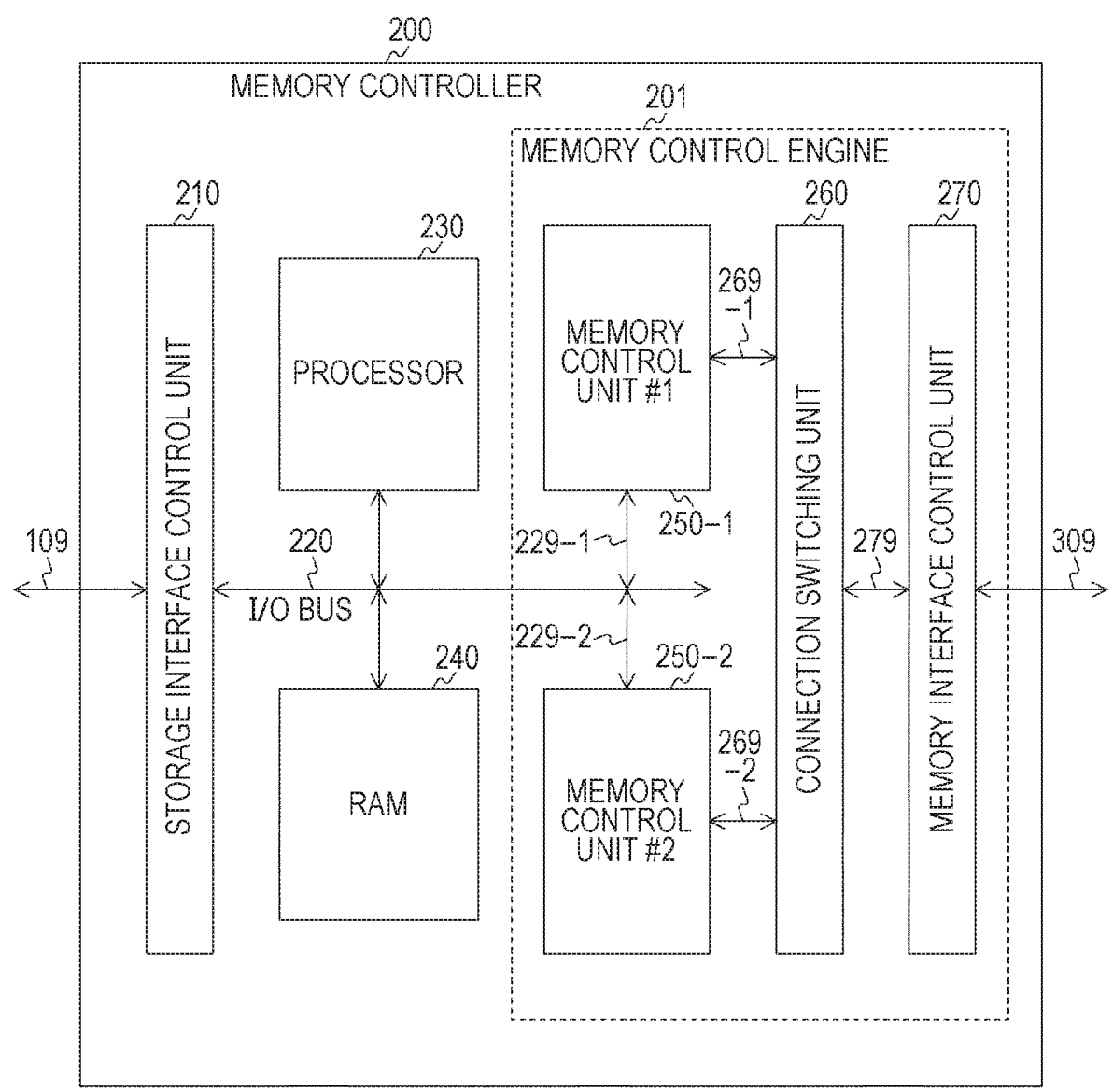
FIG. 2 is a diagram illustrating an example of the configuration of a memory controller 200 in the embodiment of the present technology.

FIG. 2 is a diagram illustrating an example of the configuration of the memory controller 200 in the embodiment of the present technology. The memory controller 200 includes a storage interface control unit 210, a processor 230, a RAM 240, and a memory control engine 201 which are connected to each other by an I/O bus 220.

The storage interface control unit 210 is connected to the host computer 100 through the signal line 109 and exchanges data with the host computer 100. Specifically, the storage interface control unit 210 includes a general-purpose bus that is used as a broad storage interface such as USB, SATA, or PCIe. A function of the storage interface control unit 210 supports a command queue that is capable of receiving a plurality of commands from the host computer 100 at the same time. Therefore, the storage interface control unit 210 randomly transmits an access request to the memory 300 to perform read access and write access.

The processor 230 performs a process required for the operation of the memory controller 200. The RAM 240 is a memory that stores, for example, data required for the operation of the memory controller 200. The RAM 240 is also used as a data buffer. The memory control engine 201 performs request control for the memory 300.

The memory control engine 201 includes two memory control units 250-1 and 250-2, a connection switching unit 260, and a memory interface control unit 270.

The memory control units 250-1 and 250-2 (hereinafter, generically referred to as memory control units 250 in some cases) independently perform request control for the memory 300. The memory control unit 250-1 controls a read request for the memory 300 (hereinafter, referred to as a "memory read control unit" in some cases). The memory control unit 250-2 controls a write request for the memory 300 (hereinafter, referred to as a "memory write control unit" in some cases). The memory control unit 250-1 is connected to the I/O bus 220 through a signal line 229-1 and is connected to the connection switching unit 260 through a signal line 269-1. The memory control unit 250-2 is connected to the I/O bus 220 through a signal line 229-2 and is connected to the connection switching unit 260 through a signal line 269-2. Hereinafter, in some cases, the signal lines 229-1 and 229-2 are generically referred to as signal lines 229. In addition, in some cases, the signal lines 269-1 and 269-2 are generically referred to as signal lines 269.

The connection switching unit 260 performs switching such that one of the memory control units 250-1 and 250-2 is connected to the memory 300. The memory interface control unit 270 is connected to the connection switching unit 260 through a signal line 279 and exchanges data with the memory 300.

In addition, it is premised that the bandwidth of the I/O bus 220 is greater than the read and write bandwidth of the memory 300. Therefore, it is assumed that the performance of the memory 300 limits the performance of the memory system 400.

Figure 3:
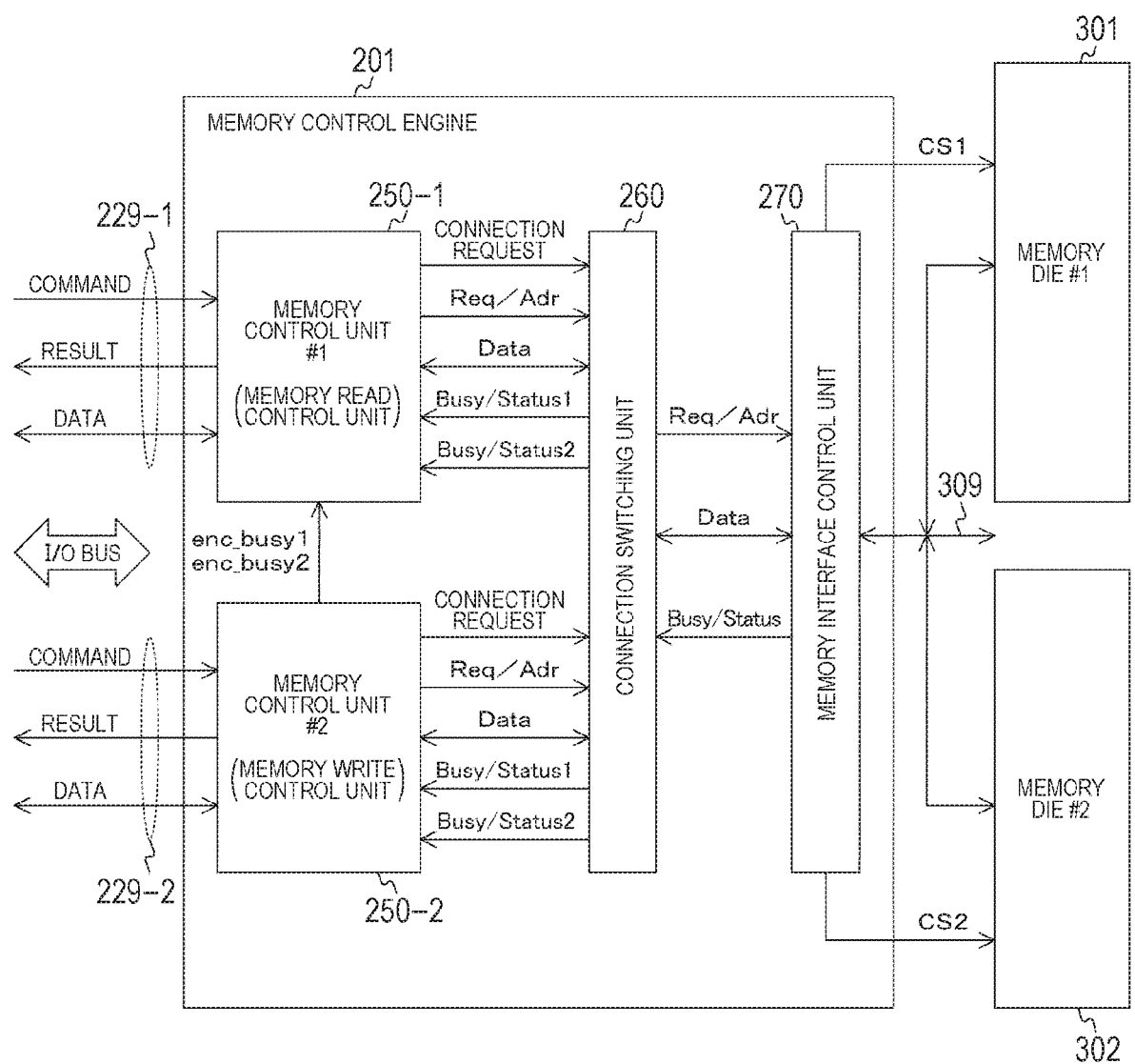
FIG. 3 is a diagram illustrating an example of signal lines of a memory control engine 201 in a first embodiment of the present technology.

FIG. 3 is a diagram illustrating an example of the signal lines of the memory control engine 201 in the first embodiment of the present technology.

The signal lines 229 between the memory control unit 250 and the I/O bus 220 include a command signal line, a data signal line, and a result signal line. In addition, the signal lines 269 between the memory control unit 250 and the connection switching unit 260 include a connection request signal line, a request/address (Req/Adr) signal line, a data signal line, a Busy/Status1 signal line, and a Busy/Status2 signal line. In addition, the signal lines 279 between the connection switching unit 260 and the memory interface control unit 270 include a request/address (Req/Adr) signal line, a data signal line, and a Busy/Status signal line.

The storage interface control unit 210 supplies the command issued from the host computer 100 to one of two memory control units 250-1 and 250-2 in response to the command. Each of the memory control units 250 receives the command issued from the host computer 100, independently generates a request for the memory 300, and performs control. With this configuration, the memory control units 250 are operated in parallel to reduce the standby time on the memory interface control unit 270.

The memory control engine 201 is connected to two memory dies, that is, memory die #1 (301) and memory die #2 (302) through signal lines 309. Which of the memory dies #1 and #2 is accessed is designated by chip select signals CS1 and CS2 from the memory interface control unit 270. The Busy/Status1 signal line indicates the busy status of the memory die #1 and the Busy/Status2 signal line indicates the busy status of the memory die #2.

As described above, the memory control unit 250-1 controls a read request for the memory 300 and the memory control unit 250-2 controls a write request for the memory 300. The memory control unit 250-2 performs data processing for write data. Here, for example, a process of generating an error correcting code (ECC) for write data is assumed as the data processing. However, the data processing may be other processes such as encryption. The memory control unit 250-2 outputs a signal "enc_busy1" and a signal "enc_busy2" to the memory control unit 250-1. The signal "enc_busy1" indicates whether or not the error correcting code of the write data related to a write request for the memory die #1 is being generated. In a case where the error correcting code is being generated, the signal indicates a "busy state". In a case where the error correcting code is not being generated, the signal indicates an "idle state". Similarly, the signal "enc_busy2" indicates whether or not the error correcting code of the write data related to a write request for the memory die #2 is being generated.

The memory control units 250-1 and 250-2 can perform request control for the memory dies #1 and #2 in parallel. That is, the memory control unit 250-1 performs a read request for one of the memory dies #1 and #2 and then ends the transmission of a request signal to the connection switching unit 260. Immediately, the memory control unit 250-2 can perform a write request for the other of the memory dies #1 and #2.

For this process, the memory control unit 250 receives the Busy/Status signals for the memory dies #1 and #2 from the memory interface control unit 270 and manages the Busy/Status signals. In a case where status information indicating the completion of writing is received from the memory dies #1 and #2, the memory control unit 250 clears write busy information. The memory control unit 250 does not transmit the next write request to the memory dies #1 and #2 in a write busy state. In addition, the memory control unit 250 outputs a connection request to the connection switching unit 260 in order to check the status information of the memory dies #1 and #2 in the write busy state. After checking the status information, the memory control unit 250 stops the transmission of the connection request.

In addition, the memory dies #1 and #2 are an example of memories described in the claims.

Figure 4:
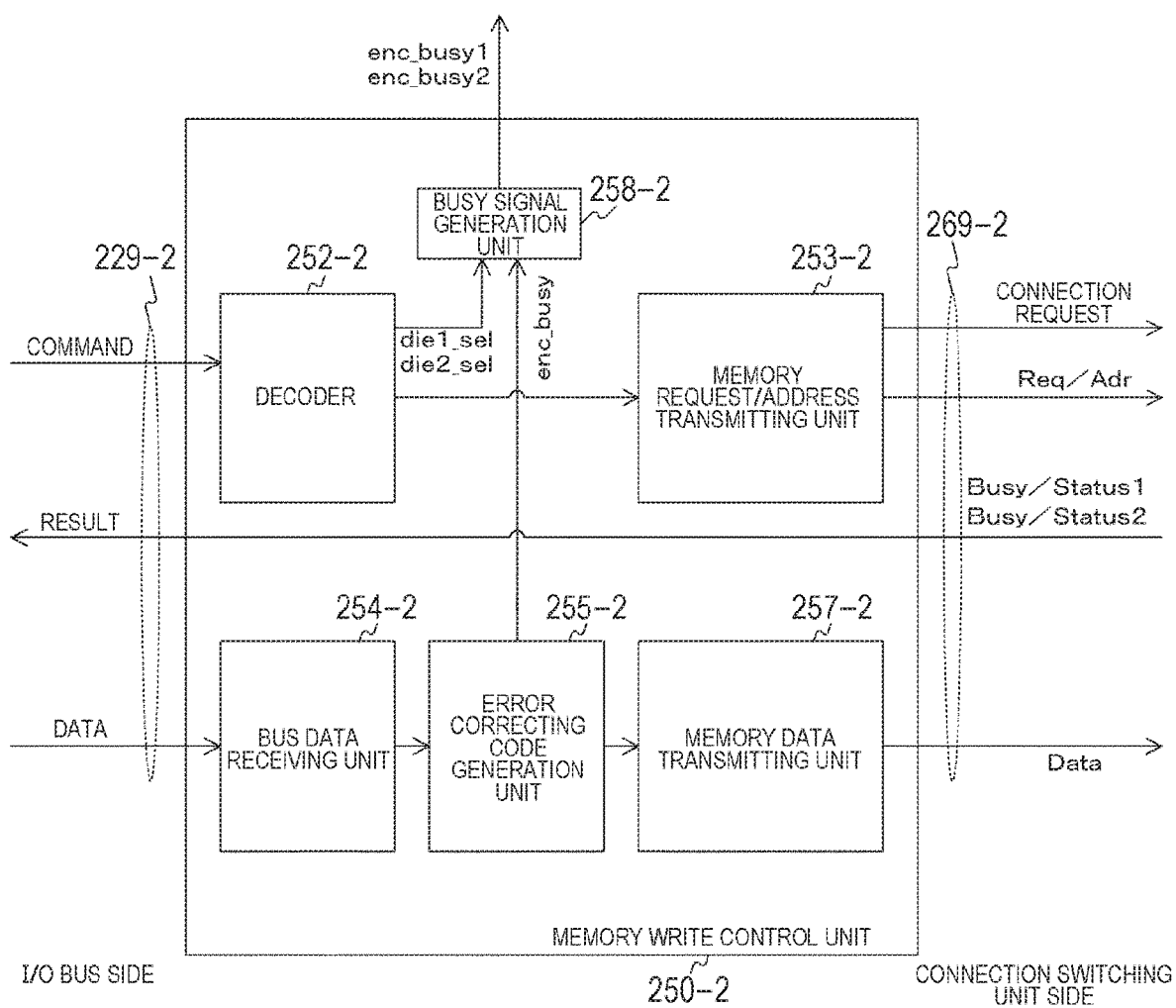
FIG. 4 is a diagram illustrating an example of the configuration of a memory control unit (memory write control unit) 250-2 in the first embodiment of the present technology.

FIG. 4 is a diagram illustrating an example of the configuration of the memory control unit (memory write control unit) 250-2 in the first embodiment of the present technology. The memory control unit 250-2 includes a decoder 252-2, a memory request/address transmitting unit 253-2, a bus data receiving unit 254-2, an error correcting code generation unit 255-2, a memory data transmitting unit 257-2, and a busy signal generation unit 258-2.

The decoder 252-2 is a decoder that interprets the command from the host computer 100. For example, a signal "die1_sel" is asserted in a case where the decoding result shows that a write command is related to the memory die #1 and a signal "die2_sel" is asserted in a case where the decoding result shows that a write command is related to the memory die #2.

The memory request/address transmitting unit 253-2 transmits a request and an address to the memory 300 according to the decoding result of the decoder 252-2. In a case where the memory request/address transmitting unit 253-2 transmits the request and the address, it outputs a connection request to the connection switching unit 260 before the transmission of the request and the address.

The bus data receiving unit 254-2 receives write data from the I/O bus 220 and supplies the write data to the error correcting code generation unit 255-2.

The error correcting code generation unit 255-2 generates an error correcting code (ECC) for the write data received from the bus data receiving unit 254-2. The error correcting code generation unit 255-2 asserts a signal "enc_busy" in a case where it is generating the error correcting code for the write data supplied from the bus data receiving unit 254-2. That is, the signal "enc_busy" indicates a "busy state" in a case where the error correcting code is being generated and indicates an "idle state" in a case where the error correcting code is not being generated.

The memory data transmitting unit 257-2 transmits the write data and the error correcting code to the memory 300.

The busy signal generation unit 259-2 generates a busy signal indicating whether or not the error correcting code of the write data related to a write request is being generated for each of the memory dies #1 and #2. That is, in a case where the signal "enc_busy" indicates the "busy state", if the signal "die1_sel" is asserted, the signal "enc_busy1" indicates the "busy state" and the signal "enc_busy2" indicates the "idle state". In addition, in this case, if the signal "die2_sel" is asserted, the signal "enc_busy2" indicates the "busy state" and the signal "enc_busy1" indicates the "idle state". On the other hand, in a case where the signal "enc_busy" indicates the "idle state", both the signal "enc_busy1" and the signal "enc_busy2" indicate the "idle state".

Figure 5:
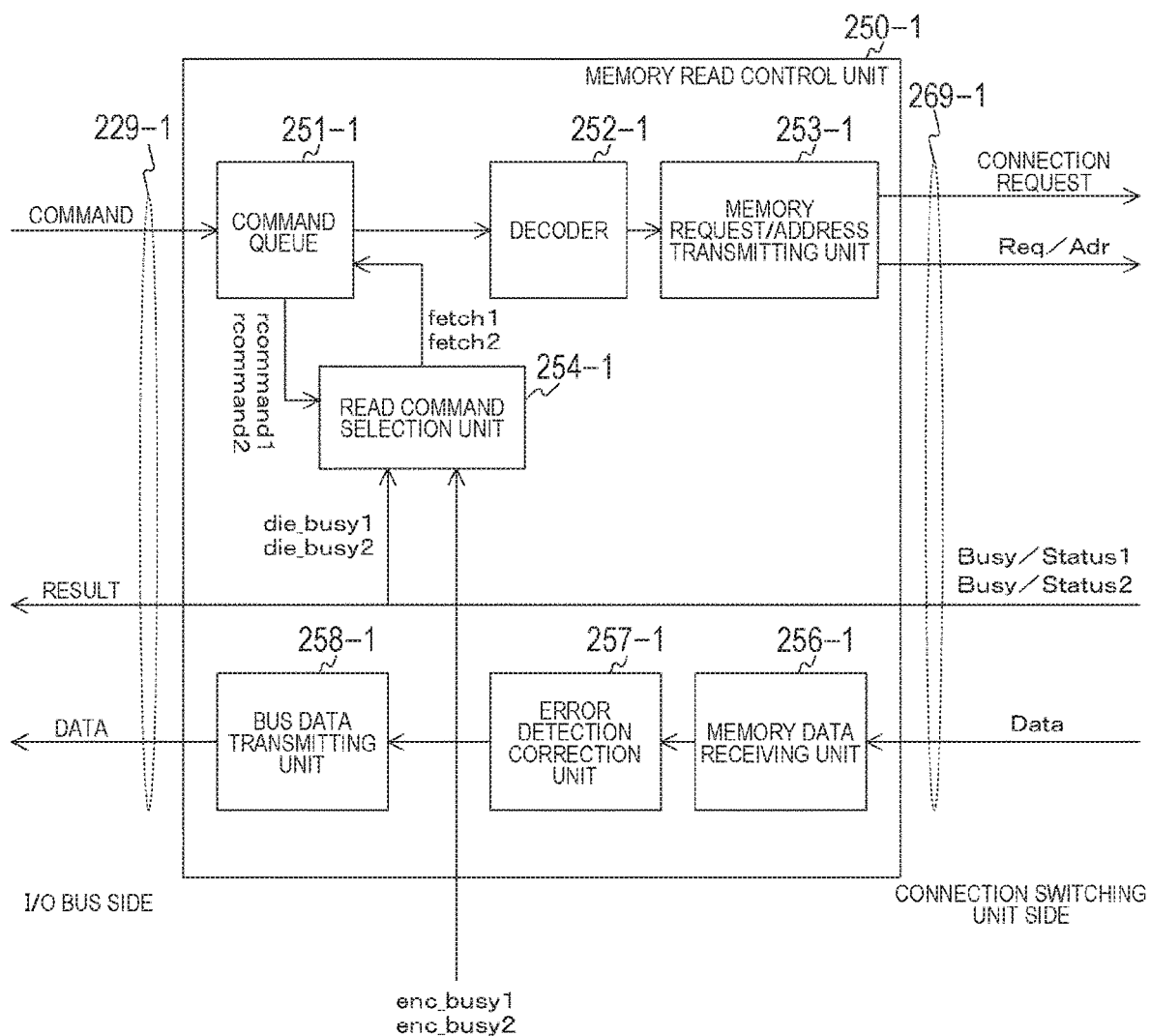
FIG. 5 is a diagram illustrating an example of the configuration of a memory control unit (memory read control unit) 250-1 in the first embodiment of the present technology.

FIG. 5 is a diagram illustrating an example of the configuration of the memory control unit (memory read control unit) 250-1 in the first embodiment of the present technology. The memory control unit 250-1 includes a command queue 251-1, a decoder 252-1, a memory request/address transmitting unit 253-1, and a read command selection unit 254-1. In addition, the memory control unit 250-1 includes a memory data receiving unit 256-1, an error detection correction unit 257-1, and a bus data transmitting unit 258-1.

The command queue 251-1 is a memory that stores the read command issued from the host computer 100. The command queue 251-1 stores the read commands for each of the memory dies #1 and #2 in a first-in first-out (FIFO) manner in correspondence with the memory dies #1 and #2. Then, in a case where the read command for the memory die #1 is stored, the command queue 251-1 asserts a signal "rcommand1". In a case where the read command for the memory die #2 is stored, the command queue 251-1 asserts a signal "rcommand2". Since the read command is managed for each of the memory dies #1 and #2, the signal "rcommand1" and the signal "rcommand2" can be asserted at the same time.

The decoder 252-1 is a decoder that interprets the command from the host computer 100, similarly to the decoder 252-2. The memory request/address transmitting unit 253-1 transmits a request and an address to the memory 300 according to the decoding result of the decoder 252-1, similarly to the memory request/address transmitting unit 253-2.

The memory data receiving unit 256-1 receives the read data and the error correcting code read from the memory 300. The error detection correction unit 257-1 performs error detection and error correction with the error correcting code for the read data received by the memory data receiving unit 256-1. The bus data transmitting unit 258-1 transmits the read data output from the error detection correction unit 257-1 to the I/O bus 220.

The read command selection unit 254-1 selects a read command to be extracted and supplied to the decoder 252-1 among the read commands stored in the command queue 251-1. The signal "enc_busy1", the signal "enc_busy2", a signal "die_busy1", a signal "die_busy2", the signal "rcommand1", and the signal "rcommand2" are input to the read command selection unit 254-1. As described above, the signal "enc_busy1" and the signal "enc_busy2" are busy signals generated by the busy signal generation unit 258-2 and indicate whether or not the error correcting code is being generated for each of the memory dies #1 and #2. The signal "die_busy1" and the signal "die_busy2" are a portion of the Busy/Status signal of the memory dies #1 and #2 and indicate whether or not the memory dies #1 and #2 are in the busy state. The signal "rcommand1" and the signal "rcommand2" indicate whether or not the read command stored in the command queue 251-1 is present for each of the memory dies #1 and #2. The read command selection unit 254-1 generates priority for each of the memory dies #1 and #2 on the basis of the input signals.

Then, the read command selection unit 254-1 generates a control signal for extracting a command corresponding to one of the memory dies #1 and #2 from the command queue 251-1 according to the generated priority. That is, in a case where a command corresponding to the memory die #1 is extracted, the read command selection unit 254-1 asserts a signal "fetch1". On the other hand, in a case where a command corresponding to the memory die #2 is extracted, the read command selection unit 254-1 asserts a signal "fetch2". In addition, in a case where no commands are extracted, the read command selection unit 254-1 does not assert any of the signal "fetch1" and the signal "fetch2". The command queue 251-1 supplies the command corresponding to one of the memory dies #1 and #2 to the decoder 252-1 according to the signal "fetch1" and the signal "fetch2" supplied from the read command selection unit 254-1.

[Content of Operation of Memory Controller]

FIG. 6 is a diagram illustrating an example of the rule of giving priority to a read command by the read command selection unit 254-1 in the first embodiment of the present technology.

Here, priorities for the memory dies #1 and #2 are independently treated. Therefore, whether or not a read command for the memory die #1 is present in the command queue 251-1 is determined by the signal "rcommand1". In addition, whether or not a read command for the memory die #2 is present in the command queue 251-2 is determined by the signal "rcommand2". Similarly, whether or not the memory die #1 is in the busy state is determined by the signal "die_busy1" and whether or not the memory die #2 is in the busy state is determined by the signal "die_busy2"

In addition, whether or not write data for the memory die #1 is being prepared is determined by the signal "enc_busy1" and whether or not write data for the memory die #2 is being prepared is determined by the signal "enc_busy2". That is, in the first embodiment, whether or not the write data for the memory die is being prepared is determined on the basis of the data processing state of the write data.

In addition, in the following description, the memory die, to which a command to give priority is to be transmitted, is referred to as a "target memory die". In addition, the command queues 251-1 and 251-2 are generically referred to as the command queues 251.

In a case where a read command for the target memory die is present in the command queue 251, the target memory die is not in the busy state, and write data for the target memory die is not being prepared, priority is "medium". In contrast, in a case where the target memory die is not in the busy state and write data for the target memory die is being prepared, priority is "high". That is, in a case where write data is being prepared in the target memory die, the priority of the subsequent read command in the target memory die is set to be higher than usual. The reason is as follows. In a case where write data is being prepared in the target memory die, write access is expected to start in the near future. Therefore, the subsequent read access to the target memory die is performed first until the write access starts.

In a case where a read command for the target memory die is present in the command queue 251 and the target memory die is in the busy state, the read command is excluded from a selection target. Therefore, priority is not given. Similarly, in a case where a read command for the target memory die is absent in the command queue 251, priority is not given since a target read command is absent.

Figure 7:
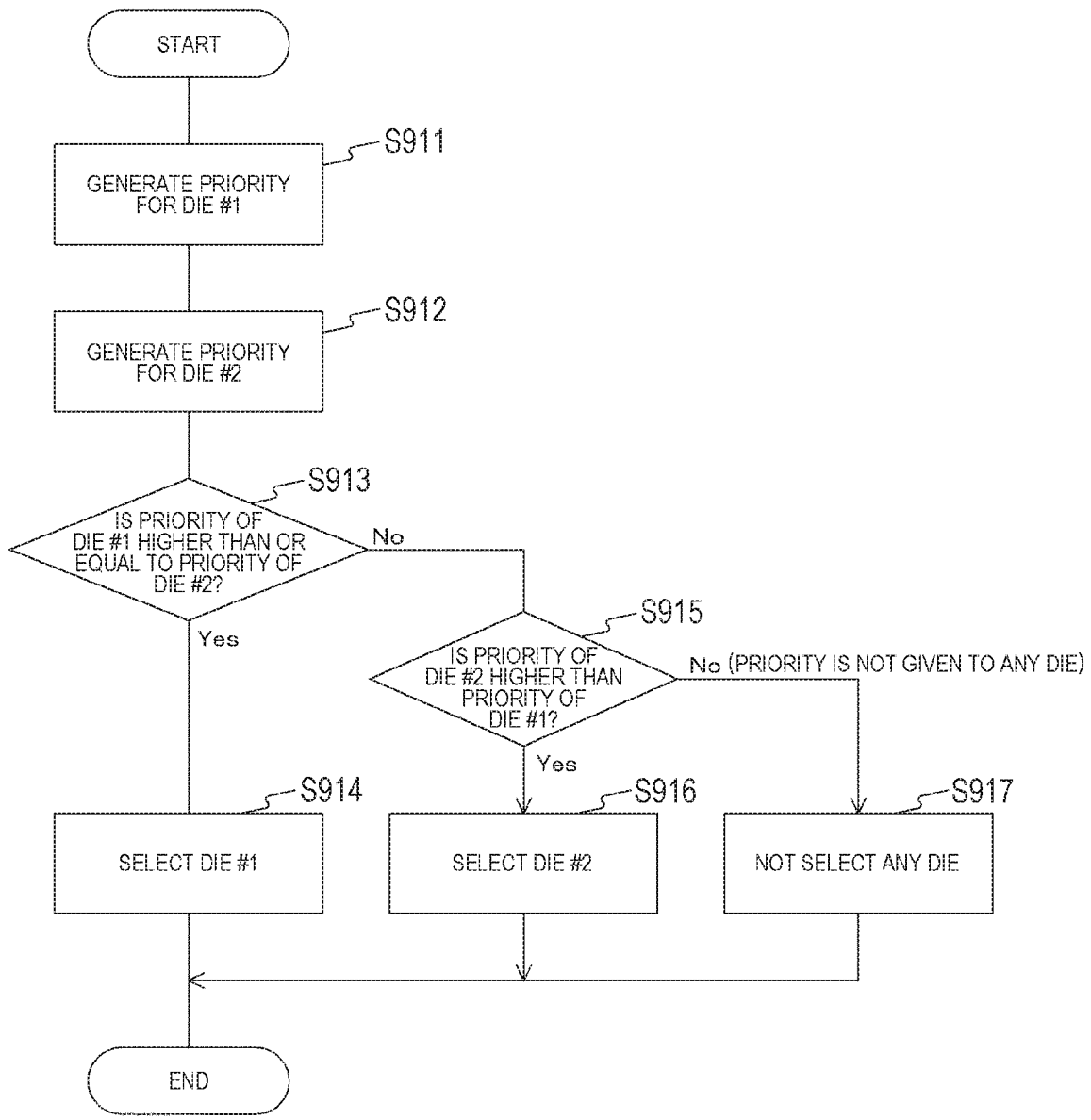
FIG. 7 is a flowchart illustrating an example of the procedure of a read command selection process of the read command selection unit 254-1 in the first embodiment of the present technology.

FIG. 7 is a flowchart illustrating an example of the procedure of a read command selection process of the read command selection unit 254-1 in the present technology.

First, the read command selection unit 254-1 sets the memory die #1 as the target memory die and gives priority to the read command according to the above-mentioned rule of giving priority (Step S911). Then, the read command selection unit 254-1 sets the memory die #2 as the target memory die and gives priority to the read command according to the above-mentioned rule of giving priority (Step S912).

As a result, the read command selection unit 254-1 compares the priority of the read command for the memory die #1 with the priority of the read command for the memory die #2 (Step S913). In a case where the priority of the former is higher than the priority of the latter or in a case where the priorities are equal to each other (Step S913: Yes), the read command selection unit 254-1 selects the read command for the memory die #1 (Step S914).

On the other hand, in a case where the priority of the read command for the memory die #2 is higher than the priority of the read command for the memory die #1 (Step S915: Yes), the read command selection unit 254-1 selects the read command for the memory die #2 (Step S916).

In the other cases, priority is not given to any read command. Therefore, the read command selection unit 254-1 does not select a read command from the command queue 251 (Step S917).

[Operation Timing of Memory Controller]

Figure 8:
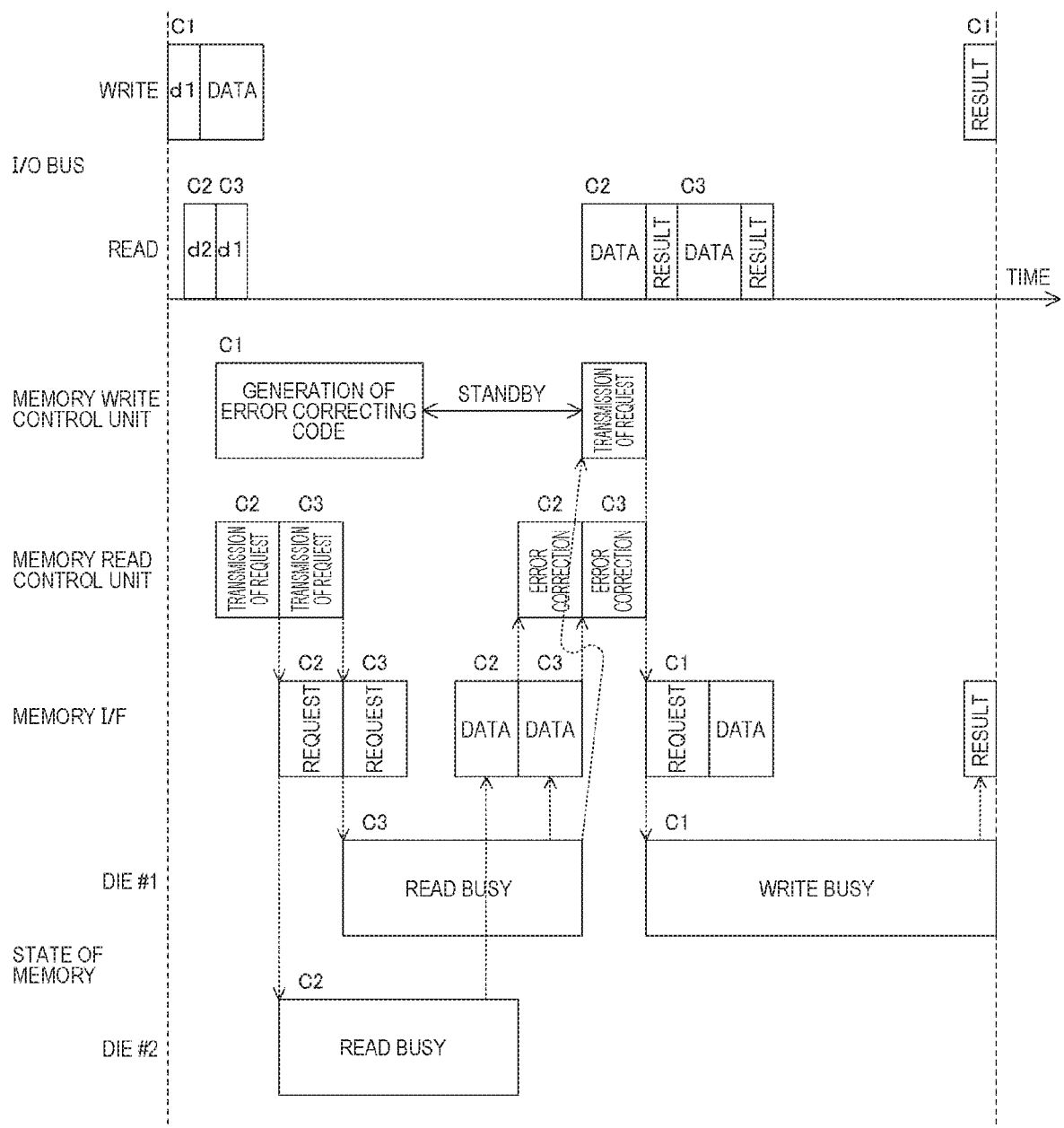
FIG. 8 illustrates a comparative example for describing the operation timing of the memory controller 200 in the first embodiment of the present technology.

FIG. 8 is a comparative example for describing the operation timing of the memory controller 200 in the first embodiment of the present technology. In this example, the host computer 100 issues commands in the order of a write command C1 for the memory die #1, a read command C2 for the memory die #2, and a read command C3 for the memory die #1.

In a case where the write command C1 is issued, the error correcting code generation unit 255-2 of the memory write control unit 250-2 starts to generate the error correcting code. Then, the read commands C2 and C3 are issued. In the comparative example, it is assumed that the memory read control unit 250-1 does not rearrange the commands. Therefore, first, the memory read control unit 250-1 requires a request related to the read command C2 of the memory die #2. Then, the memory read control unit 250-1 requires a request related to the read command C3 of the memory die #1.

Since the memory die #1 is maintained in the busy state until the request related to the read command C3 is completed, the requirement of the request related to the write command C1 is in a standby state until the request for the read command C3 is completed. After the request related to the read command C3 is completed, the request related to the write command C1 is transmitted to the memory die #1 together with the write data and the error correcting code of the write data. The result of the write command is returned to the memory controller 200 and is also given in notification to the host computer 100.

That is, in the comparative example, the request related to the read command C3 is delayed by the request related to the read command C2 and the requirement of the request related to the write command C1 is awaited by the completion of the request for the read command C3. Therefore, in a case where the request related to the read command C3 is processed before the request related to the read command C2, standby for the request related to the write command C1 is reduced.

Figure 9:
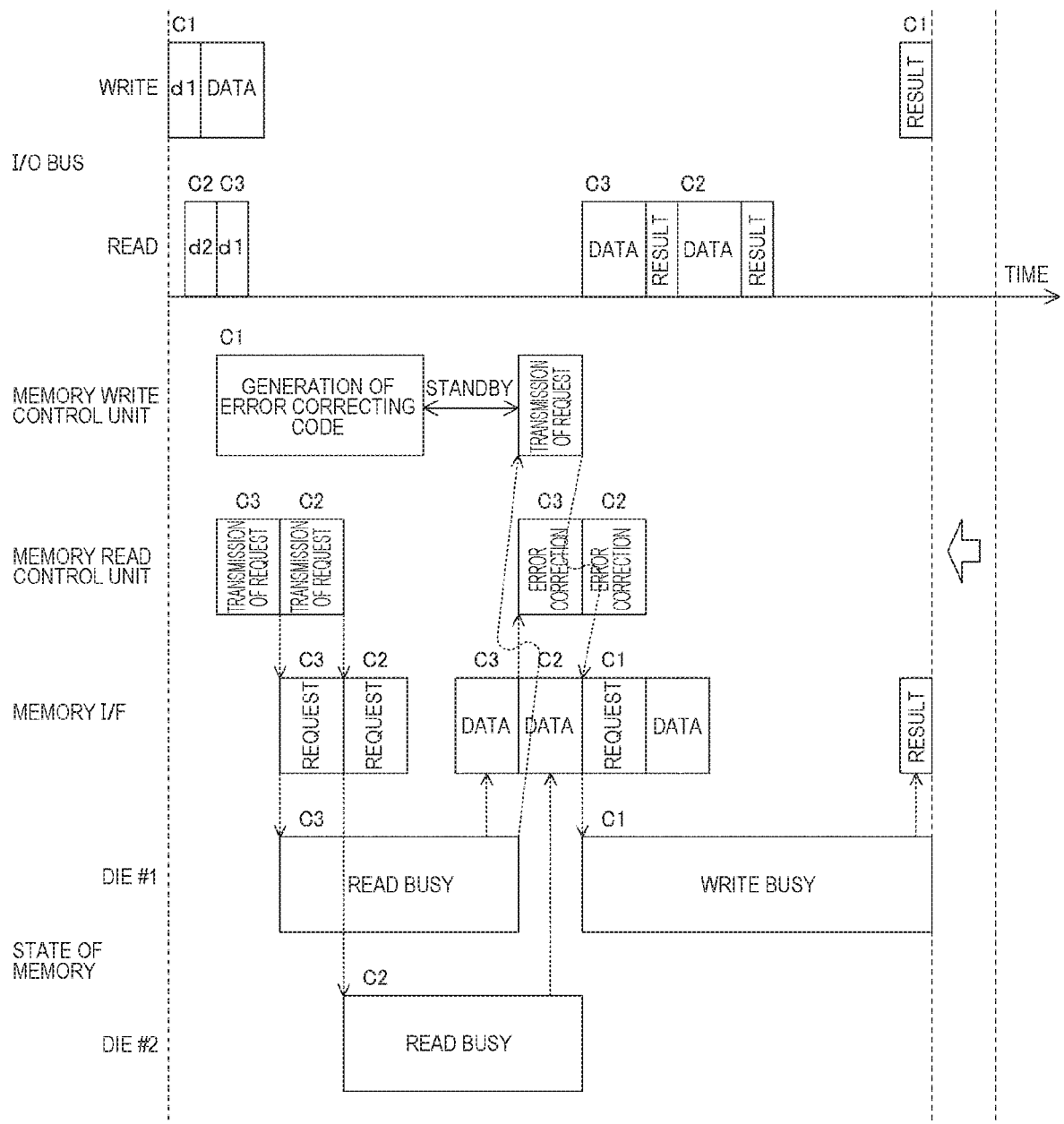
FIG. 9 illustrates an example of the operation timing of the memory controller 200 in the first embodiment of the present technology.

FIG. 9 illustrates an example of the operation timing of the memory controller 200 in the first embodiment of the present technology. Here, the similar command order to that in the example illustrated in FIG. 8 is assumed. However, the memory read control unit 250-1 rearranges the commands to reduce the time until a process ends.

This example is similar to the above-mentioned example in that the write command C1 is issued and the error correcting code generation unit 255-2 of the memory write control unit 250-2 starts to generate the error correcting code. Then, in a case where the read commands stored in the command queue 251 are selected, the memory read control unit 250-1 gives priority to each read command. In this case, the memory dies #1 and #2 are in an idle state. In addition, in the memory die #1, since the error correcting code has been generated, the priority of the read command C3 for the memory die #1 is set to "high". In contrast, in the memory die #2, since the error correcting code has not been generated, the priority of the read command C2 for the memory die #2 is set to "medium".

The memory read control unit 250-1 compares the priority of the read command C3 for the memory die #1 with the priority of the read command C2 for the memory die #2, selects the read command C3 with a higher priority first, and requires a read request of the memory die #1. Then, the memory read control unit 250-1 selects the other read command C2 and requires a read request of the memory die #2.

Since the memory die #1 is maintained in the busy state until the request for the read command C3 is completed, the requirement of the request related to the write command C1 is in a standby state similarly to the above-mentioned example. However, in the first embodiment, since the request related to the read command C3 is processed before the request related to the read command C2, the completion timing of the request related to the read command C3 is early. Therefore, standby for the request related to the write command C1 is reduced. As a result, the time until the process ends is shorter than that in the above-mentioned example.

As such, in the first embodiment of the present technology, it is presumed that write access starts in the memory die in which write data is being prepared after a certain period of time elapses and high priority is given to the subsequent read command in the memory die. Therefore, until write access starts, the subsequent read access is performed first in the memory die and it is possible to reduce the time until the entire process ends.

2. Second Embodiment

In the first embodiment, it is assumed that the subsequent read access in the memory die in which write data is being prepared is preferentially performed. In a second embodiment, in addition to the configuration according to the first embodiment, it is assumed that, in a state in which the preparation of write data has been completed, the priority of the subsequent read access is set to be low on the contrary. In addition, since the overall configuration of an information processing system is similar to that in the first embodiment, the detailed description thereof will not be repeated.

[Configuration of Memory Controller]

Figure 10:
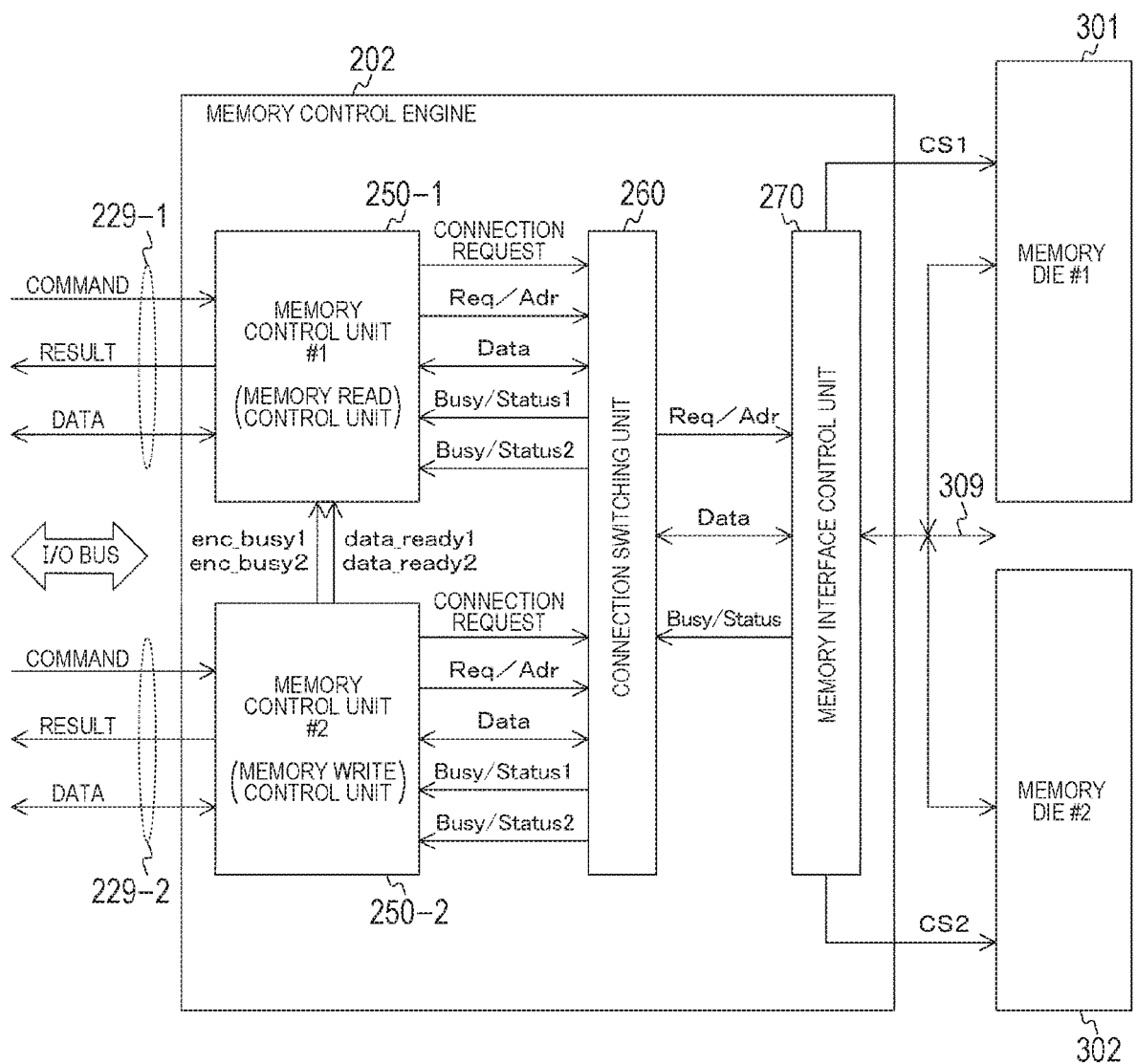
FIG. 10 is a diagram illustrating an example of signal lines of a memory control engine 202 in a second embodiment of the present technology.

FIG. 10 is a diagram illustrating an example of signal lines of a memory control engine 202 in the second embodiment of the present technology. The second embodiment differs from the first embodiment in that a memory control unit 250-2 supplies a signal "data_ready1" and a signal "data_ready2" to a memory control unit 250-1 in the memory control engine 202. The other points are similar to those in the memory control engine 201 described with reference to FIG. 3.

The signal "data_ready1" indicates whether or not the generation of the error correcting code of the write data related to a write request for the memory die #1 has been completed. Ina case where the generation of the error correcting code has been completed, the signal "data_ready1" indicates a "completed state". In a case where the generation of the error correcting code has not been completed, the signal "data_ready1" indicates an "uncompleted state". Similarly, the signal "data_ready2" indicates whether or not the generation of the error correcting code of the write data related to a write request for the memory die #2 has been completed.

Figure 11:
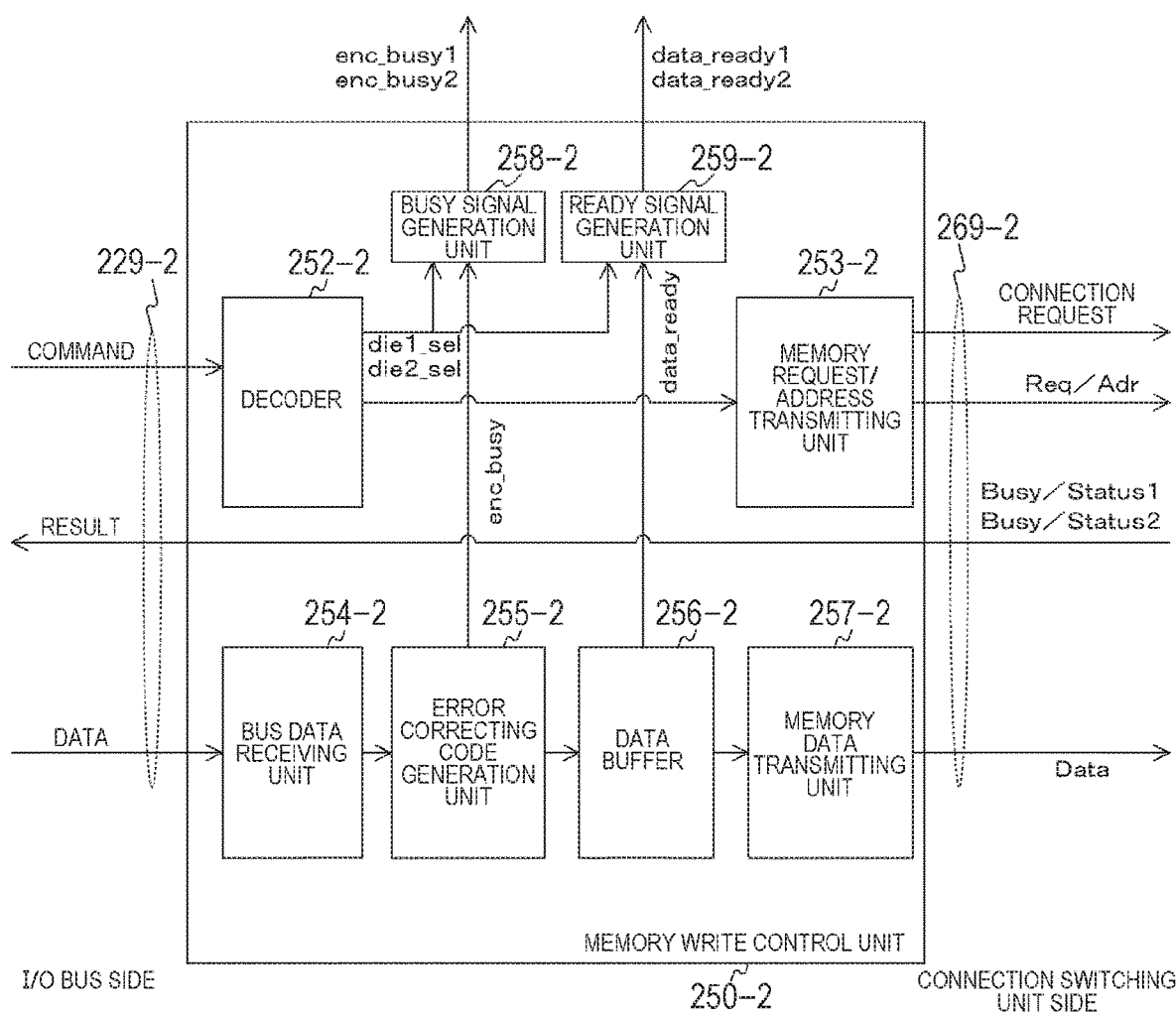
FIG. 11 is a diagram illustrating an example of the configuration of a memory control unit (memory write control unit) 250-2 in the second embodiment of the present technology.

FIG. 11 is a diagram illustrating an example of the configuration of the memory control unit (memory write control unit) 250-2 in the second embodiment of the present technology. The memory control unit 250-2 according to the second embodiment includes a data buffer 256-2 and a ready signal generation unit 259-2 in addition to the components according to the first embodiment.

The data buffer 256-2 is a buffer that stores write data and the data correction code generated by the error correcting code generation unit 255-2. Since the data buffer 256-2 is provided, the error correcting code generation unit 255-2 can generate the data correction code if there is a space in the data buffer 256-2 even in a case where the corresponding memory die is in a busy state. In a case where the generation of the data correction code is completed and the write data and the data correction code are stored in the data buffer 256-2, the signal "data_ready" indicates the "completed state". A case where the signal "data_ready" indicates the "completed state" means that preparation has been completed such that a write request can be immediately required.

The ready signal generation unit 259-2 generates a ready signal indicating whether or not the generation of the error correcting code of the write data related to a write request has been completed for each of the memory dies #1 and #2. That is, in a case where the signal "data_ready" indicates the "completed state" and the signal "die1_sel" is asserted, a signal "data_ready1" indicates the "completed state" and a signal "data_ready2" indicates the "uncompleted state". Furthermore, in a case where the signal "die2_sel" is asserted, the signal "data_ready2" indicates the "completed state" and the signal "data_ready1" indicates the "uncompleted state". In contrast, in a case where the signal "data_ready" indicates the "uncompleted state", both the signal "data_ready1" and the signal "data_ready2" indicate the "uncompleted state".

Figure 12:
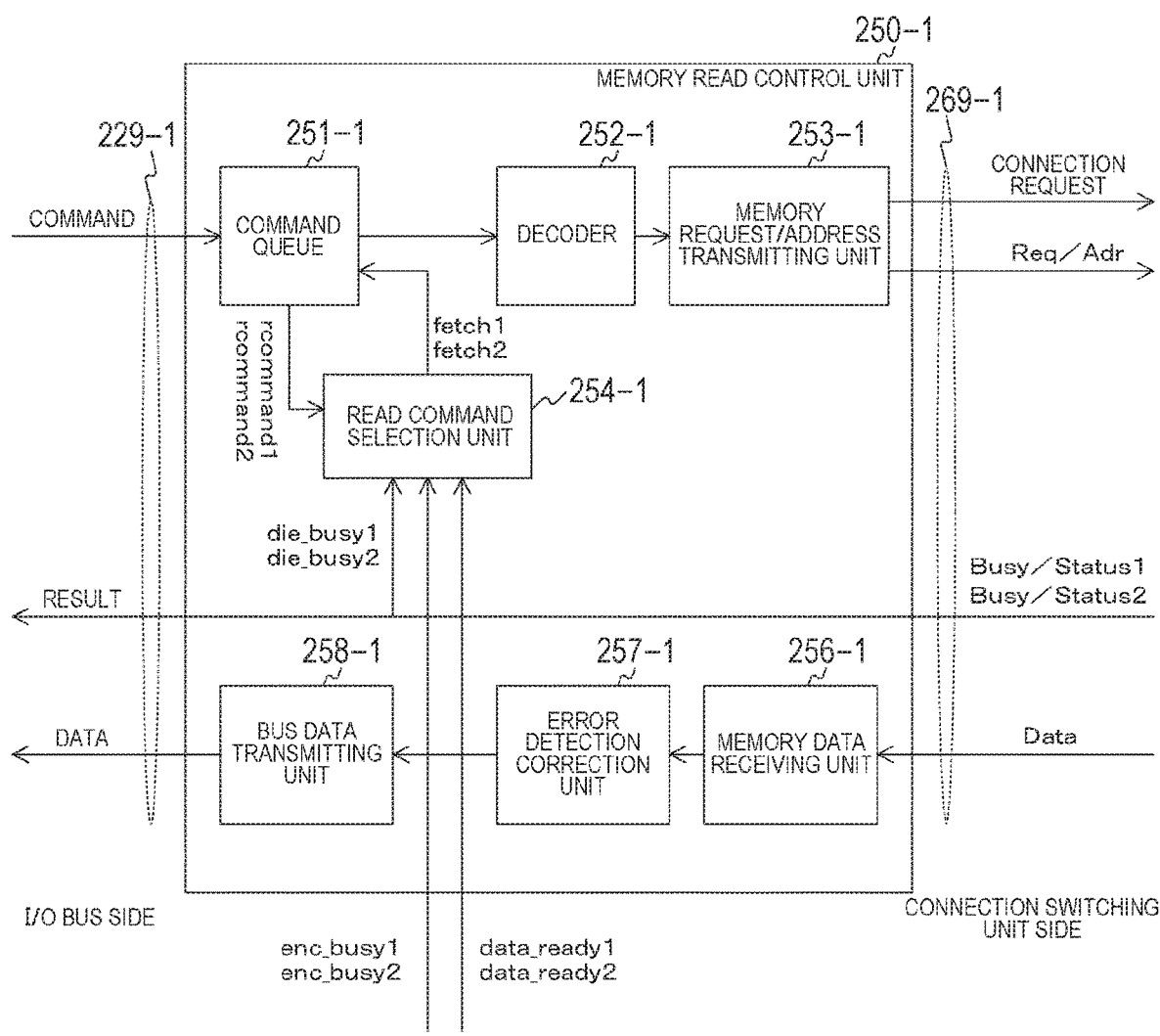
FIG. 12 is a diagram illustrating an example of the configuration of a memory control unit (memory read control unit) 250-1 in the second embodiment of the present technology.

FIG. 12 is a diagram illustrating an example of the configuration of the memory control unit (memory read control unit) 250-1 in the second embodiment of the present technology. The memory control unit 250-1 according to the second embodiment differs from the memory control unit 250-1 according to the first embodiment in that the read command selection unit 254-1 further receives the signal "data_ready1" and the signal "data_ready2".

Similarly to the first embodiment, the read command selection unit 254-1 selects a read command to be extracted and supplied to the decoder 252-1 among the read commands stored in the command queue 251-1. At that time, the read command selection unit 254-1 according to the second embodiment differs from the read command selection unit 254-1 according to the first embodiment in that it considers the state of the signal "data_ready1" and the signal "data_ready2" supplied from the data buffer 256-2.

[Content of Operation of Memory Controller]

FIG. 13 is a diagram illustrating an example of the rule of giving priority to a read command by the read command selection unit 254-1 in the second embodiment of the present technology.

Here, priorities for the memory dies #1 and #2 are independently treated, similarly to the first embodiment. In addition to the above-mentioned signals, whether or not the preparation of write data for the memory die #1 has been completed is determined by the signal "data_ready1" and whether or not the preparation of write data for the memory die #2 has been completed is determined by the signal "data_ready2". That is, in the second embodiment, whether or not write data is being prepared for the memory die and whether or not the preparation has been completed are determined on the basis of the data processing state of the write data.

In a case where a read command for a target memory die is present in the command queue 251, the target memory die is not in the busy state, write data is not being prepared for the target memory die, and the preparation of the write data has not been completed, priority is "middle". In addition, in a case where the target memory die is not in the busy state and write data is being prepared for the target memory die, priority is "high". This process is similar to that in the first embodiment.

In addition to this process, in the second embodiment, in a case where the target memory die is not in the busy state and the preparation of write data for the target memory die has been completed, priority is "low". That is, in a case where the preparation of write data has been completed in the target memory die, the priority of the subsequent read command in the target memory die is set to be lower than usual. The reason is as follows. In a case where the preparation of write data in the target memory die is completed, it is expected that write access will start immediately and the target memory die will become the busy state. Therefore, read access is preferentially performed for memory dies other than the target memory die.

In addition, similarly to the first embodiment, in a case where a read command for the target memory die is present in the command queue 251 and the target memory die is in the busy state, the read command is excluded from a selection target. Therefore, priority is not given to the read command. Similarly, in a case where a read command for the target memory die is absent in the command queue 251, priority is not given since a target read command is absent.

The read command selection unit 254-1 selects a read command according to the set priority. Since a read command selection process procedure of the read command selection unit 254-1 in the second embodiment is similar to that in the first embodiment described with reference to FIG. 7, the detailed description thereof will not be repeated.

[Operation Timing of Memory Controller]

Figure 14:
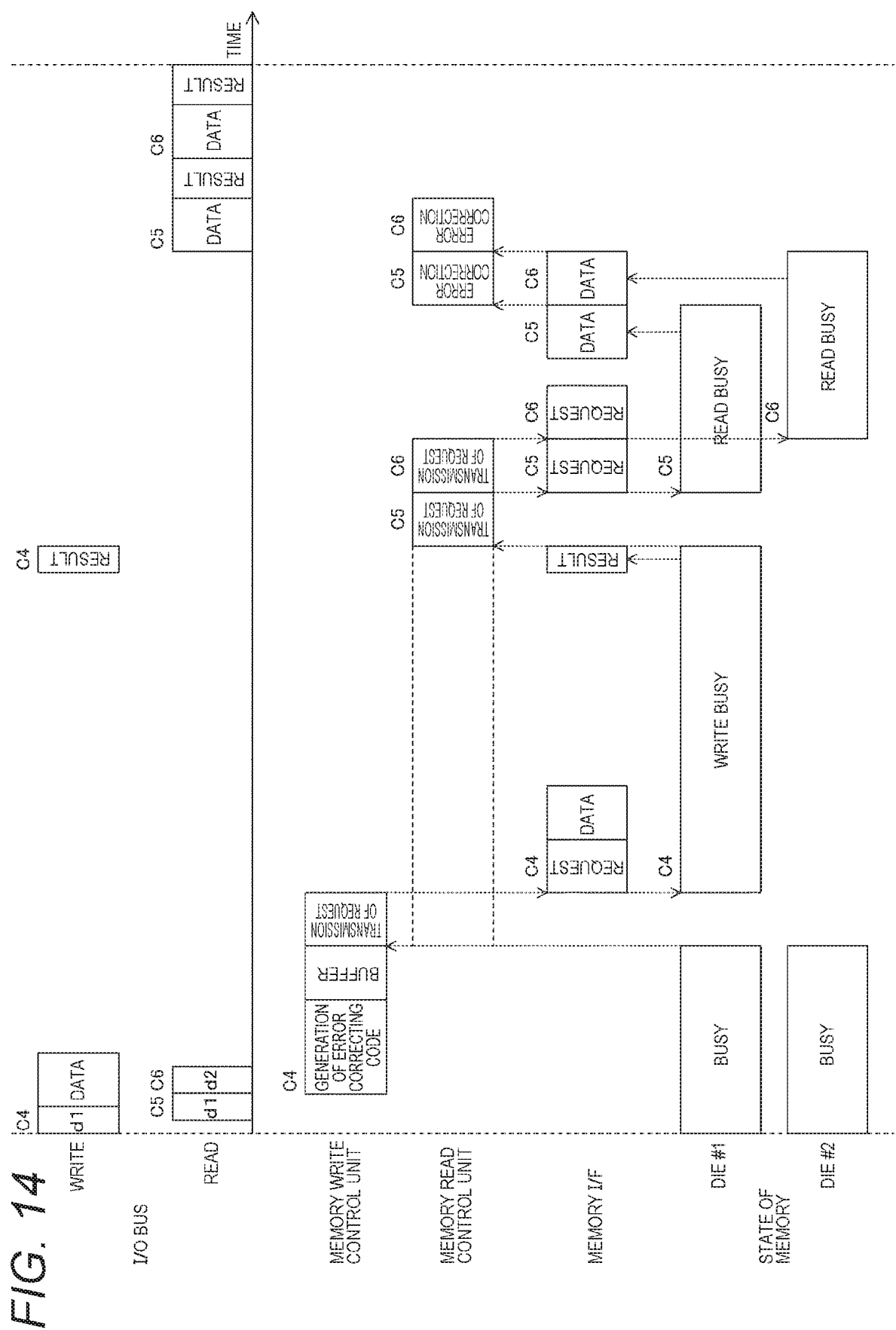
FIG. 14 illustrates a comparative example for describing the operation timing of a memory controller 200 in the second embodiment of the present technology.

FIG. 14 illustrates a comparative example for describing the operation timing of the memory controller 200 in the second embodiment of the present technology. In this example, the host computer 100 issues commands in the order of a write command C4 for the memory die #1, a read command C5 for the memory die #1, and a read command C6 for the memory die #2. In addition, it is assumed that the memory dies #1 and #2 have already been in the busy state by another request before the write command C4.

In a case where the write command C4 is issued, the error correcting code generation unit 255-2 of the memory write control unit 250-2 starts to generate the error correcting code. Then, the read commands C5 and C6 are issued. In the comparative example, it is assumed that the memory read control unit 250-1 does not rearrange the commands. Therefore, the memory read control unit 250-1 stands by for the end of write access related to the write command C4 and requires a request related to the read command C5 of the memory die #1. Then, the memory read control unit 250-1 requires a request related to the read command C6 of the memory die #2.

In the comparative example, the memory read control unit stands by for the transmission of the request related to the read command C5 and then transmits the request related to the read command C6. Therefore, even though the memory die #2 is in the idle state, the memory read control unit stands by for the transmission of the request related to the read command C6. Therefore, in a case where the request related to the read command C6 is processed before the request related to the read command C5, the time until the process ends is reduced.

Figure 15:
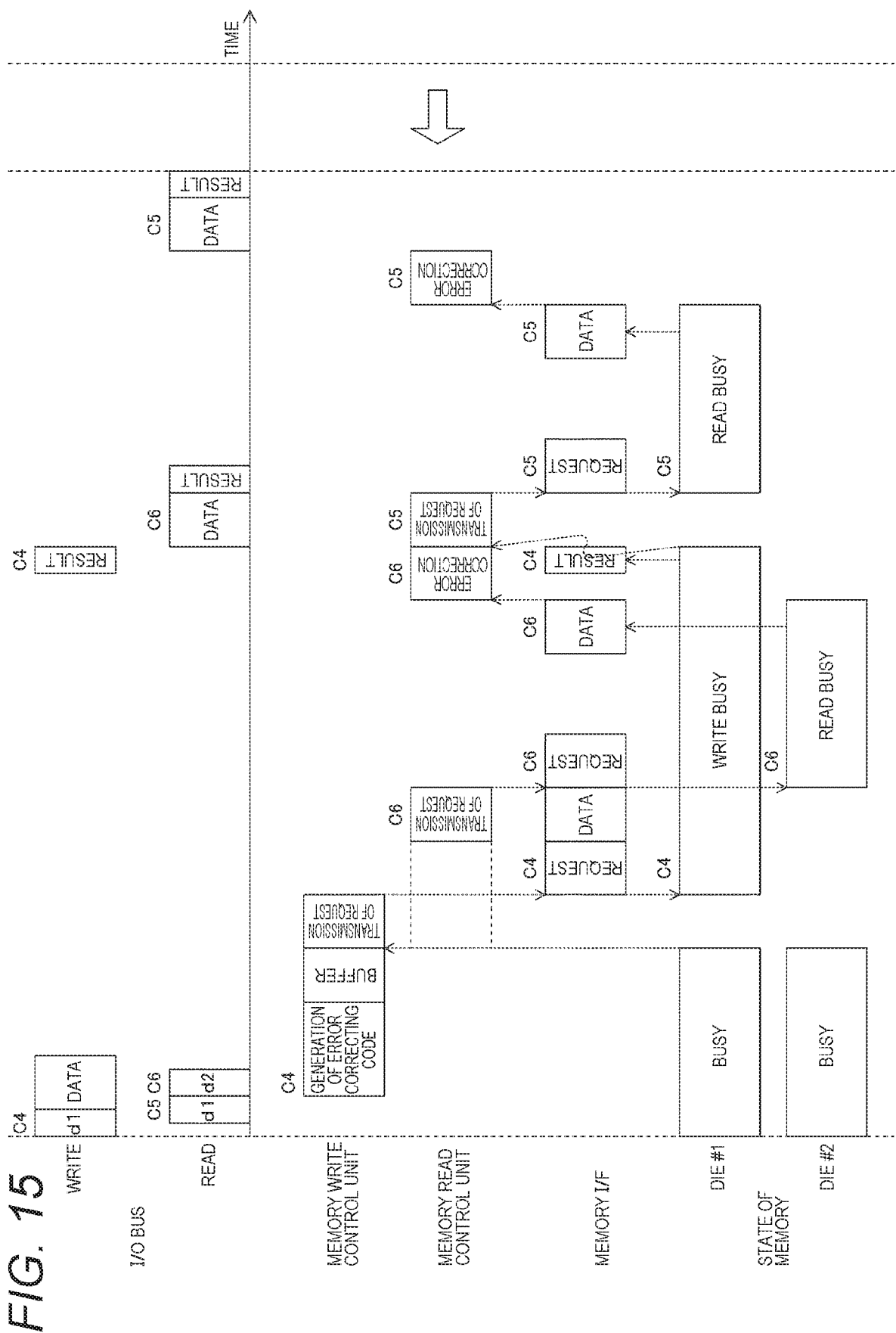
FIG. 15 illustrates an example of the operation timing of the memory controller 200 in the second embodiment of the present technology.

FIG. 15 illustrates an example of the operation timing of the memory controller 200 in the second embodiment of the present technology. Here, the similar command order to that in the example illustrated in FIG. 14 is assumed. However, the memory read control unit 250-1 rearranges the commands to reduce the time until a process ends.

This example is similar to the above-mentioned example in that the write command C4 is issued and the error correcting code generation unit 255-2 of the memory write control unit 250-2 starts to generate the error correcting code. However, since both the memory dies #1 and #2 are in the busy state at this point of time, the memory read control unit 250-1 does not give priority to any read command. Then, the write data and the error correcting code related to the write command C4 are stored in the data buffer 256-2.

In a case where the memory dies #1 and #2 are in the idle state, the memory read control unit 250-1 gives priority to the read commands C5 and C6. That is, for the memory die #1, since the generation of the error correcting code related to the write command C4 has been completed and the signal "data_ready1" indicates the "completed state", the priority of the read command C5 is set to "low". In addition, for the memory die #2, since the error correcting code has not been generated and the signal "enc_busy2" indicates "not prepared", the priority of the read command C6 is set to "medium".

The memory read control unit 250-1 compares the priority of the read command C5 for the memory die #1 with the priority of the read command C6 for the memory die #2, selects the read command C6 with a higher priority first, and requires a read request of the memory die #2. Then, after write access related to the write command C4 in the memory die #1 is completed, the memory read control unit 250-1 selects the other read command C5 and requires a read request of the memory die #1.

By the above-mentioned process, write access related to the write command C4 in the memory die #1 and read access related to the read command C6 in the memory die #2 are performed in parallel. Therefore, the time until the entire process ends is reduced.

As such, in the second embodiment of the present technology, in a case where the preparation of write data has been completed, it is presumed that a write request is immediately required for the corresponding memory die and low priority is given to the subsequent read command in the memory die. Therefore, read access is performed first in other memory dies and it is possible to reduce the time until the entire process ends.

In addition, the above-described embodiments are examples for embodying the present technology and the matters in the embodiments correspond to the matters specifying the invention in the claims. Similarly, the matters for specifying the invention in the claims correspond to the matters in the embodiments of the present technology which have the same name as those for specifying the invention. However, the present technology is not limited to the embodiments and can be embodied by modifying the embodiments in various ways without departing from the scope and spirit of the present technology.

In addition, the processing procedure described in the embodiments may be regarded as a method having these series of procedures or may be regarded as a program that causes a computer to execute these series of procedures or a recording medium that stores the program. For example, a compact disc (CD), a mini disc (MD), a digital versatile disc (DVD), a memory card, and a Blu-ray (registered trademark) disc can be used as the recording medium.

In addition, the effects described in the specification are illustrative, are not limited, and may be other effects.

Furthermore, the present technology can be configured as follows.

(1) A memory controller including:

a memory write control unit that generates a write request for any one of a plurality of memories on the basis of a write command from a computer; and a memory read control unit that generates a read request for any one of the plurality of memories according to priority corresponding to a data processing state of write data related to the write request in the memory write control unit on the basis of a read command from the computer.

(2) The memory controller according to (1), in which the memory write control unit includes:

an error correcting code generation unit that generates an error correcting code for the write data; and a busy signal generation unit that generates, as the data processing state, a busy signal indicating whether or not the error correcting code for the write data is being generated for each of the plurality of memories, and the memory read control unit sets the priority of a memory corresponding to the busy signal indicating that the error correcting code is being generated among the plurality of memories to be high.

(3) The memory controller according to (2), in which the memory write control unit further includes:

a data buffer that stores the write data for which the error correcting code has been generated; and a ready signal generation unit that generates, as the data processing state, a ready signal indicating whether or not the generation of the error correcting code for the write data has been completed for each of the plurality of memories and whether or not the write data has been prepared in the data buffer, and the memory read control unit sets the priority of a memory corresponding to the ready signal indicating that the generation of the error correcting code has been completed among the plurality of memories to be low.

(4) The memory controller according to any one of (1) to (3), in which the memory read control unit includes:

a command queue that stores the read command from the computer;

a read command selection unit that sets the priority corresponding to the data processing state of the write data related to the write request in the memory write control unit to each of the plurality of memories and selects a read command for any one of the plurality of memories from the command queue according to the priority; and a memory request/address transmitting unit that generates a read request and an address for any one of the plurality of memories on the basis of the selected read command and transmits the read request and the address to the memory.

(5) A memory system including:

a plurality of memories;

a memory write control unit that generates a write request for any one of the plurality of memories on the basis of a write command from a computer; and a memory read control unit that generates a read request for any one of the plurality of memories according to priority corresponding to a data processing state of write data related to the write request in the memory write control unit on the basis of a read command from the computer.

(6) An information processing system including:

a plurality of memories;

a computer;

a memory write control unit that generates a write request for any one of the plurality of memories on the basis of a write command from the computer; and a memory read control unit that generates a read request for any one of the plurality of memories according to priority corresponding to a data processing state of write data related to the write request in the memory write control unit on the basis of a read command from the computer.

REFERENCE SIGNS LIST

100 Host computer
200 Memory controller
201, 202 Memory control engine
210 Storage interface control unit
220 I/O bus
230 Processor
240 RAM
250-1 Memory control unit (memory read control unit)
250-2 Memory control unit (memory write control unit)
251-1 Command queue
252-1, 252-2 Decoder
253-1, 253-2 Memory request/address transmitting unit
254-1 Read command selection unit
254-2 Bus data receiving unit
255-2 Error correcting code generation unit
256-1 Memory data receiving unit
256-2 Data buffer
257-1 Error detection correction unit
257-2 Memory data transmitting unit
258-1 Bus data transmitting unit
258-2 Busy signal generation unit
259-2 Ready signal generation unit
260 Connection switching unit
270 Memory interface control unit
300 Memory
301, 302 Memory die
400 Memory system

The invention claimed is:

1. A memory controller, comprising:

a memory write control unit that includes:

a first memory request/address transmitting unit configured to generate a write request for a specific memory of a plurality of memories based on a write command from a computer;

an error correcting code generation unit configured to generate an error correcting code for write data related to the write request for the specific memory; and a busy signal generation unit configured to generate, as a data processing state, a busy signal for each of the plurality of memories, wherein the busy signal of each of the plurality of memories indicates a corresponding status of generation of the error correcting code for the write data for each of the plurality of memories; and a memory read control unit that includes:

a read command selection unit configured to set a priority of a read command from the computer for each of the plurality of memories based on the generated busy signal, wherein the priority of the read command is set high for the specific memory, among the plurality of memories, for which the busy signal indicates the generation of the error correcting code; and a second memory request/address transmitting unit configured to generate a read request for the specific memory of the plurality of memories based on the set priority and the read command.

2. The memory controller according to claim 1, wherein the memory write control unit further includes:

a data buffer configured to store the write data related to the write request; and a ready signal generation unit configured to generate, as the data processing state, a ready signal for each of the plurality of memories, wherein the ready signal of each of the plurality of memories indicates a corresponding status of completion of the generation of the error correcting code for the write data for each of the plurality of memories and a status of storage of the write data in the data buffer, and the read command selection unit is further configured to set the priority of the read command for each of the plurality of memories based on the generated ready signal, wherein the priority of the read command is set low for the specific memory, among the plurality of memories, for which the ready signal indicates that the generation of the error correcting code is completed.

3. The memory controller according to claim 1, wherein the memory read control unit further includes a command queue configured to store the read command from the computer, and the read command selection unit is further configured to set the priority corresponding to the data processing state of the write data related to the write request to each of the plurality of memories, and select the read command for the specific memory of the plurality of memories from the command queue based on the priority; and the second memory request/address transmitting unit is further configured to:

generate the read request and an address for the specific memory of the plurality of memories based on the the selected read command, and transmit the read request and the address to the specific memory.

4. A memory system, comprising:

a plurality of memories;

a memory write control unit that includes:

a first memory request/address transmitting unit configured to generate a write request for a specific memory of the plurality of memories based on a write command from a computer;

an error correcting code generation unit configured to generate an error correcting code for write data related to the write request for the specific memory; and a busy signal generation unit configured to generate, as a data processing state, a busy signal for each of the plurality of memories, wherein the busy signal of each of the plurality of memories indicates a corresponding status of generation of the error correcting code for the write data for each of the plurality of memories; and a memory read control unit that includes:

a read command selection unit configured to set a priority of a read command from the computer for each of the plurality of memories based on the generated busy signal, wherein the priority of the read command is set high for the specific memory, among the plurality of memories, for which the busy signal indicates the generation of the error correcting code; and a second memory request/address transmitting unit configured to generate a read request for the specific memory of the plurality of memories based on the set priority and the read command.

5. An information processing system, comprising:

a plurality of memories;

a computer;

a memory write control unit that includes:

a first memory request/address transmitting unit configured to generate a write request for a specific memory of the plurality of memories based on a write command from the computer;

an error correcting code generation unit configured to generate an error correcting code for write data related to the write request for the specific memory; and a busy signal generation unit configured to generate, as a data processing state, a busy signal for each of the plurality of memories, wherein the busy signal of each of the plurality of memories indicates a corresponding status of generation of the error correcting code for the write data for each of the plurality of memories; and a memory read control unit that includes:

a read command selection unit configured to set a priority of a read command from the computer for each of the plurality of memories based on the generated busy signal, wherein the priority of the read command is set high for the specific memory, among the plurality of memories, for which the busy signal indicates the generation of the error correcting code; and a second memory request/address transmitting unit configured to generate a read request for the specific memory of the plurality of memories based on the set priority and the read command.

\* \* \* \* \*